Patented Oct. 28, 1947

2,429,679

UNITED STATES PATENT OFFICE 2,429,679

COMPOSITION CONTAINING A CELLULOSE COMPOUND AND A MORPHOLIDE

Louis W. Georges, New Orleans, La., assignor to the United States of America, as represented by the Secretary of Agriculture No Drawing. Original application August 21, 1943, Serial No. 499,503. Divided and this application September 23, 1944, Serial No. 555,571

4 Claims. (Cl. 106—176)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This is a division of my copending application for patent, Serial No. 499,503, filed August 21, 1943.

This invention relates to a process for plasticizing cellulose derivative compositions.

I have found that morpholides obtained by reacting morpholine (tetrahydro-p-oxazine) with acylating agents of certain organic acids, such as caprylic, capric, lauric, myristic, palmitic, benzoic, abietic, and adipic acids, are excellent plasticizers for cellulose acetate and other cellulose derivatives. The method of preparing these morpholides is illustrated by the following examples:

Example I

*Capryl morpholide.*—Crude capric anhydride (282 gm.) was reacted with morpholine (96 gm.) (12 percent excess). There was considerable evolution of heat and the reaction mixture was allowed to stand for several hours until it cooled to room temperature. The excess morpholine was distilled off under reduced pressure. The first fraction consisting essentially of the free fatty acid by-product distilled over at 130°–132° C. at 2–3 mm. The main fraction came over at 163°–167° C. at 2–3 mm. Yield, 193 gm. Theoretical yield, 208 gm. The product is practically colorless.

Example II

*Benzoyl morpholide.*—Crude benzoic anhydride (231 gm.) was reacted with morpholine (105 gm.) (20 percent excess). The reaction was very vigorous with the evolution of much heat. The main fraction distilled over at 153°–155° C. at 1 mm. The liquid crystallized in the receiver. Yield, 132 gm. M. P. 72°–73° C.

The crude product was recrystallized from ether and petroleum ether. Yield, 98 gm. M. P. 75°–76° C.

Example III

*Myristyl morpholide.*—Morpholine (43.5 gm.) was dissolved in 220 cc. of 10 percent NaOH solution. A 10 percent excess of myristyl chloride (135 gm.) (B. P. 170–177/16 mm.) was added to the above mixture and stirring was continued for several hours. An emulsion formed which did not break on standing. The emulsion was transferred to a separatory funnel and ethyl ether was added. Th ether solution was washed several times with NaHCO$_3$ solution, and water, and then dried over anhydrous sodium sulfate. The ether was evaporated on a steam bath and the residue distilled under reduced pressure in a Claisen flask equipped with a Vigreaux column. The fraction distilling at 197°–200° C. at 2 mm. was collected. The product is a practically colorless liquid which solidified to a waxlike, solid crystalline mass on standing; M. P. 29°–30° C.

All of the above compounds were analyzed for nitrogen and the values found were in close agreement to the calculated values. These compounds are compatible with cellulose acetate and other cellulose derivatives and give clear non-exuding films.

Example IV

*Adipyl dimorpholide.*—Adipyl chloride (54.2 gm.) was dissolved in 200 cc. of CCl$_4$ and the solution added dropwise with stirring into a solution of 97.8 gm. of morpholine in 500 cc. of CCl$_4$. A white precipitate formed with the evolution of heat. An additional 100 cc. of CCl$_4$ was added to the thick slurry to facilitate stirring. The mixture was filtered in the warm, leaving a crystalline residue. A crystalline product separated from the filtrate on cooling. This latter crystalline product was filtered, washed with ethyl ether and dried in an oven; yield, 20 gm.; M. P. 122°–123° C. The first-mentioned crystalline residue melted at 137°–139° C. and at 167°–172° C., and is apparently a mixture of adipyl dimorpholide (M. P. 122°–123° C.) and morpholine hydrochloride (M. P. 176°–178° C.). The second crystalline product was analyzed for nitrogen and found to be in close agreement with the calculated value for adipyl dimorpholide, $(CH_2)_4(CO)_2(NC_4H_8O)_2$. This compound is compatible with cellulose acetate and ethyl cellulose.

The following examples illustrate the use of these compounds as plasticizers:

Example V

*Capryl morpholide.*—Secondary cellulose acetate (100 parts) (54–55 percent combined acetic acid) was mixed on a tumbling wheel with capryl morpholide (30 parts) and 420 parts of solvent (acetone/ethanol/ethyl acetate—80/15/5). The "dope" was cast on a glass plate and leveled to the desired thickness. After standing overnight the film was stripped from the glass plate.

Example VI

*Benzoyl morpholide.*—A film was made in the same manner as described in Example V above, which was composed of cellulose acetate (100 parts) (53 percent combined acetic acid), benzoyl morpholide (30 parts) and 400 parts of solvent (acetone/ethanol/ethyl acetate—80/15/5).

Example VII

*Myristyl morpholide.*—A "dope" was made of the following composition of matter and a film prepared as described in Example V above: cellulose acetate (100 parts) (54–55 percent combined acetic acid); myristyl morpholide (30 parts); acetone/ethanol/ethyl acetate—80/15/5 (350 parts).

Example VIII

*Abietyl morpholide.*—A "dope" was made of the following composition of matter and a film prepared as described in Example V above: cellulose acetate (100 parts) (54–55 percent combined acetic acid); abietyl morpholide (10 parts); acetone/ethanol/ethyl acetate—80/15/5 (420 parts).

Example IX

A film was prepared as described in Example V above, which was composed of secondary cellulose acetate (100 pts.) (54–55 percent combined AcOH), adipyl dimorpholide (30 pts.) and 370 pts. of solvent (acetone/ethanol/ethyl acetate—80/15/5).

All of the films obtained were clear and transparent, thus indicating the utility of these compounds as plasticizers for secondary cellulose acetate.

I have also used these morpholides to plasticize other derivatives than cellulose esters. In particular, I have used them with the cellulose ether, ethyl cellulose. The following two examples illustrate the preparation of films from plasticized ethyl cellulose:

Example X

Ethyl cellulose (45–46 percent EtO) (100 pts.), capryl morpholide (30 pts.) and 550 pts. of solvent (toluene/ethanol—80/20) were mixed on a tumbling wheel and a film made of the clear "dope" as described in Example V.

Example XI

A "dope" was made of the following composition of matter and a film prepared as described in Example V above; ethyl cellulose (45–46 percent EtO) (100 pts.); adipyl dimorpholide (10 pts.); toluene/ethanol—80/20 (550 pts.)

Both of these films were clear and transparent, and indicate the applicability of the compounds of this invention as plasticizers for cellulose ethers, as well as esters.

The compounds disclosed herein, especially the higher fatty acid morpholides, are particularly valuable relative to other plasticizers for cellulose acetate because of their low specific gravities, low volatilities and comparatively low solubilities in water. For example, the specific gravity, boiling point and water solubility of capryl morpholide is 0.967, 163–166 at 2 mm. and 0.05%, respectively, as compared with the values of 1.170, 185–210 at 4 mm. and 0.84%, respectively, for dimethoxy ethyl phthalate.

Having thus described my invention, I claim:

1. A film-forming composition of matter comprising as its essential film-forming ingredient a member of the group consisting of cellulose acetate and ethyl cellulose, and, as a plasticizer therefor, a morpholide of an organic acid selected from the group consisting of caprylic, capric, lauric, myristic and palmitic.

2. A film-forming composition of matter comprising as its essential film-forming ingredient a member of the group consisting of cellulose acetate and ethyl cellulose, and, as a plasticizer therefor, capryl morpholide.

3. A film-forming composition of matter comprising as its essential film-forming ingredient a member of the group consisting of cellulose acetate and ethyl cellulose, and, as a plasticizer therefor, myristyl morpholide.

4. A film-forming composition of matter comprising as its essential film-forming ingredient a member of the group consisting of cellulose acetate and ethyl cellulose, and, as a plasticizer therefor, lauryl morpholide.

LOUIS W. GEORGES.

REFERENCES CITED

The following references are of record in the file of this patent:

UNITED STATES PATENTS

| Number | Name | Date |
| --- | --- | --- |
| 2,186,628 | Dickey | Jan. 9, 1940 |
| 2,249,518 | Dickey et al. | July 15, 1941 |
| 2,292,332 | D'Alelio | Aug. 4, 1942 |
| 2,356,290 | Wendler | Aug. 22, 1944 |